(12) United States Patent
Huang

(10) Patent No.: US 8,441,445 B2
(45) Date of Patent: May 14, 2013

(54) ELECTROPHORETIC DISPLAY KEYPAD STRUCTURE

(75) Inventor: Chin-Chun Huang, Taoyuan (TW)

(73) Assignee: Ichia Technologies, Inc., Gueishan, Taoyuan (TW)

( * ) Notice: Subject to any disclaimer, the term of this patent is extended or adjusted under 35 U.S.C. 154(b) by 638 days.

(21) Appl. No.: 12/761,406

(22) Filed: Apr. 16, 2010

(65) Prior Publication Data

US 2011/0148766 A1    Jun. 23, 2011

(30) Foreign Application Priority Data

Dec. 17, 2009   (TW) ................................ 98143341 A

(51) Int. Cl.
    *G06F 3/02* (2006.01)
    *G09G 5/00* (2006.01)
(52) U.S. Cl.
    USPC ........... 345/168; 345/156; 345/167; 345/169; 345/173; 379/368
(58) Field of Classification Search .................. 345/156, 345/167, 168, 169, 173–183; 379/368
    See application file for complete search history.

(56) References Cited

U.S. PATENT DOCUMENTS

| 8,056,216 B2 | 11/2011 | Chang |
| 2005/0056531 A1* | 3/2005 | Yu et al. ........................ 200/310 |
| 2008/0037765 A1* | 2/2008 | Finney et al. ................. 379/368 |
| 2008/0179173 A1 | 7/2008 | Jung |

FOREIGN PATENT DOCUMENTS

| JP | 2003100170 | 4/2003 |
| JP | 2008250259 | 10/2008 |
| KR | 100856206 B1 | 9/2008 |
| TW | M346857 | 12/2008 |
| TW | M358354 | 6/2009 |
| TW | 200933277 | 8/2009 |
| TW | 200943343 | 10/2009 |

* cited by examiner

*Primary Examiner* — Lun-Yi Lao
*Assistant Examiner* — Insa Sadio
(74) *Attorney, Agent, or Firm* — Winston Hsu; Scott Margo

(57) ABSTRACT

An electrophoretic display keypad structure utilizes a whole piece of electrophoretic display film to show a plurality of figures for keys. The electrophoretic display film is disposed on a printed circuit board having a patterned electrode and sealed by a sealant or a sealing material applied to entire periphery of the electrophoretic display film for preventing humidity or pollution, thereby to display excellent figures and be made relatively easily. The figures displayed may be changed by selecting a desired mode, and users may accordingly easily choose desired figures for pressing the keys.

18 Claims, 8 Drawing Sheets

(a)

(b)

(c)

ELECTROPHORETIC DISPLAY KEYPAD STRUCTURE

BACKGROUND OF THE INVENTION

1. Field of the Invention

The present invention relates to a keypad structure and particularly to an electrophoretic display keypad structure.

2. Description of the Prior Art

Electronic products such as cell phones, personal digital assistants (PDAs), and the like usually have keypad keyboards. In present market, keypads are mainly categorized into metallic keypads and plastic keypads. Conventionally, the figures such as digitals, symbols and English letters of the keypads are formed by virtue of printing or laser etching method on the top surface of the keycaps. The figures may be easily stripped off or damaged due to frequently pressing. For this reason, in order to enhance the protection for the figures and increase three-dimensional aesthetic vision as well, it has been developed to form figures on the bottom surface of the keycap components. Usually, for saving area occupied by keypads on the limited surface of the electronic products, a plurality of figures may be formed on each button in accordance with operation modes. Accordingly, users must find a right button to press for performing a desired function in accordance with a selected operation mode through discerning a right figure from a plurality of the figures on a right button among a plurality of figures. Hence, no matter the figures are formed on the top or bottom surface of the keycaps, the figures appeared to users are all of the figures prompting all of the operation modes. Users must make an effort to discern a desired figure among such many figures during operation.

Additionally, an electrophoretic display (EPD) device is usually known to be used in electronic products, such as electronic paper, commercial labels, watches, sports products, healthcare products, and the like, to provide a display screen for users. The electrophoretic display is a reflective-type display device based on influence on an electrophoretic phenomena of charged particles dispersed in a dielectric solvent. A conventional electrophoretic display device includes a glass substrate, a transparent protection film disposed so as to be opposite to and spaced from the glass substrate, and an electrophoretic layer disposed between the glass substrate and the transparent protection film. Conventional electrophoretic display devices may be categorized into passive matrix and active matrix types in accordance with display driver technologies. The electrophoretic display devices are characterized by electric power saving, being light and thin, clear texts and pictures, no problems with viewing angles, being flexible, and variety, and that backlight is not needed.

Japan Pat. Application Publication No. 2008-250259 discloses a keypad using an electrophoretic display, as shown in FIG. 1, which includes a resin film 1, a transparent electrode layer 2, a display layer 3, a spacer 4, a backside electrode layer 5, and a protection layer 6. The display layer 3 includes a plurality of microcapsules 7. The spacer 4 is disposed at the periphery of the display layer 3 and has a thickness the same as or greater than that of the diameter R1 of the microcapsules 7. When the display layer 3 is pressed, the pressure onto the microcapsules 7 can be decreased due to the spacer 4. Accordingly, the microcapsules 7 are not easily broken.

Thus, the microcapsules 7 will be not broken during the insert molding or integral formation. The disclosed keypad has a structure just containing a singular button. In other words, when the electronic product bears a plurality of buttons, a number, which is the same as the number of the buttons, of such keypad structures are needed. Therefore, the cost is relatively high.

Since the keypads of the electronic products have been constantly developed to be relatively thin and small for the devices with reduced size and weight as desired, in addition to aesthetic appearance, functions, and economic aspect, so as to accord with the demand of the market, there is still a need for a novel keypad structure.

SUMMARY OF THE INVENTION

One objective of the present invention is to provide an electrophoretic display keypad structure comprising a whole piece of electrophoretic display film for providing figures, such as characters, symbols or icons, for the keypad. The displayed figures can be switched through selection of display mode to enable users to easily choose the right buttons.

According to a preferred embodiment of the present invention, an electrophoretic display keypad structure comprises a first printed circuit board comprising a circuit thereon; a plurality of metal domes disposed above the circuit, wherein, when the metal domes are pressed, the metal domes are electrically connected to the underlying circuit; a plurality of plungers disposed above the metal domes; a second printed circuit board disposed above the plungers; an electrophoretic display film disposed above the second printed circuit board and sealed at a periphery thereof, wherein the electrophoretic display film and the second printed circuit board together perform a display function, the electrophoretic display film displays a plurality of figures when the display function is turned on, and the figures are located correspondingly to the metal domes; a frontlight unit disposed above the electrophoretic display film; and a keycap structure disposed above the frontlight unit.

According to another preferred embodiment of the present invention, an electrophoretic display keypad structure comprises a printed circuit board; an electrophoretic display film disposed above the printed circuit board and sealed at a periphery thereof, wherein the electrophoretic display film and the printed circuit board together perform a display function, the electrophoretic display film displays a plurality of figures for serving as button locations when the display function is turned on; a frontlight unit disposed above the electrophoretic display film; and a touch pad disposed above the frontlight unit for output of signals corresponding to the button locations under touched positions of the touch pad.

In the electrophoretic display keypad structure according to the present invention, an electrophoretic display film is utilized to display figures for serving as characters, symbols or icons on the keypad. The figures to be displayed can be switched upon selection of the display mode. Accordingly, users may easily and clearly discern the characters, symbols or icons on the keypad. This advantage is more remarkable with respect to the users with poor vision or the seniors. Furthermore, since the electrophoretic display film disposed in the structure according to the present invention is in a form of a whole piece and sealed by sealing at the periphery to keeping moisture or pollutants away from the electrophoretic display film, it can work well and conveniently and easily manufactured.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
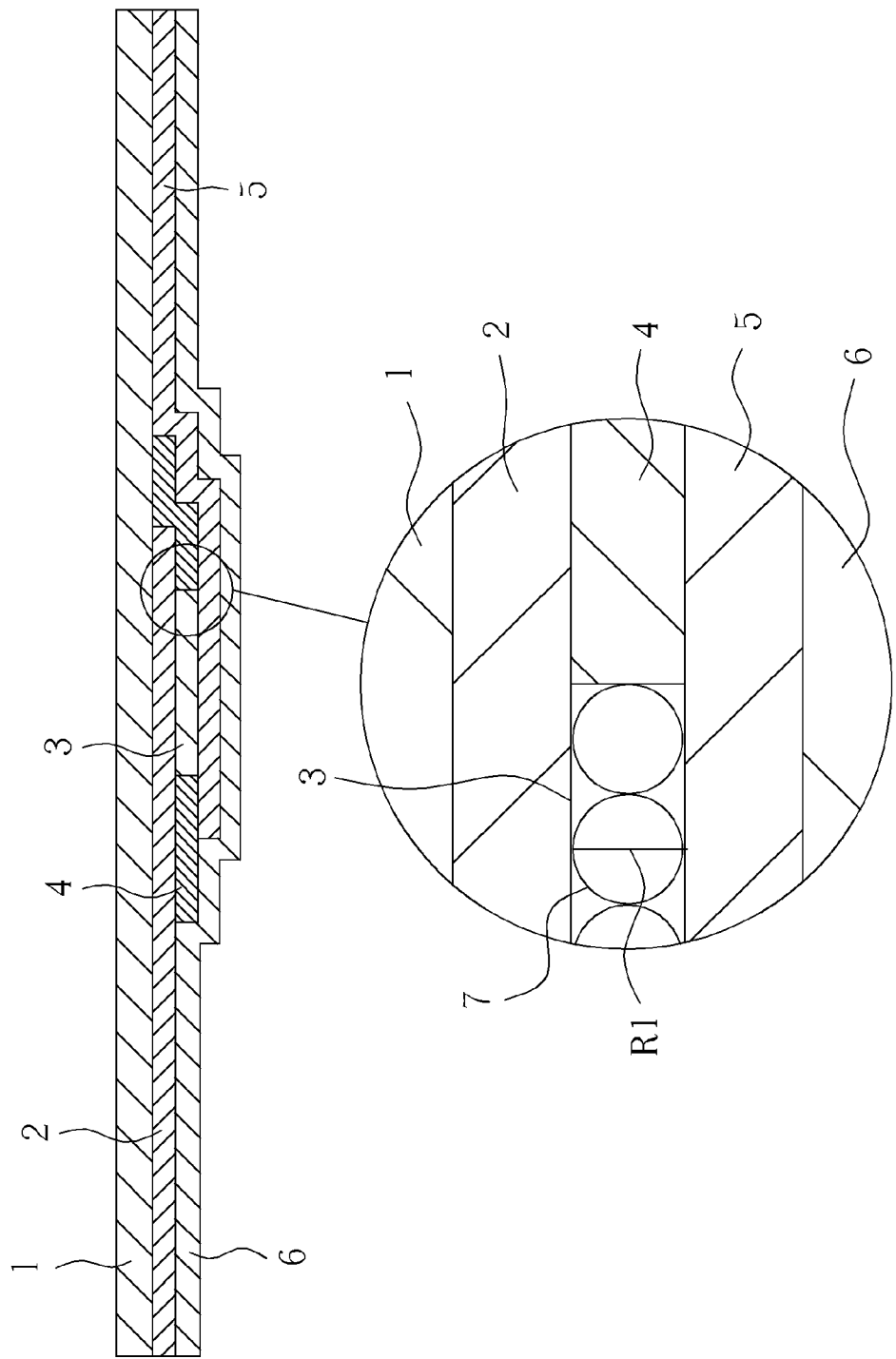
FIG. 1 shows a schematic diagram illustrating a conventional keypad structure.
Figure 2:
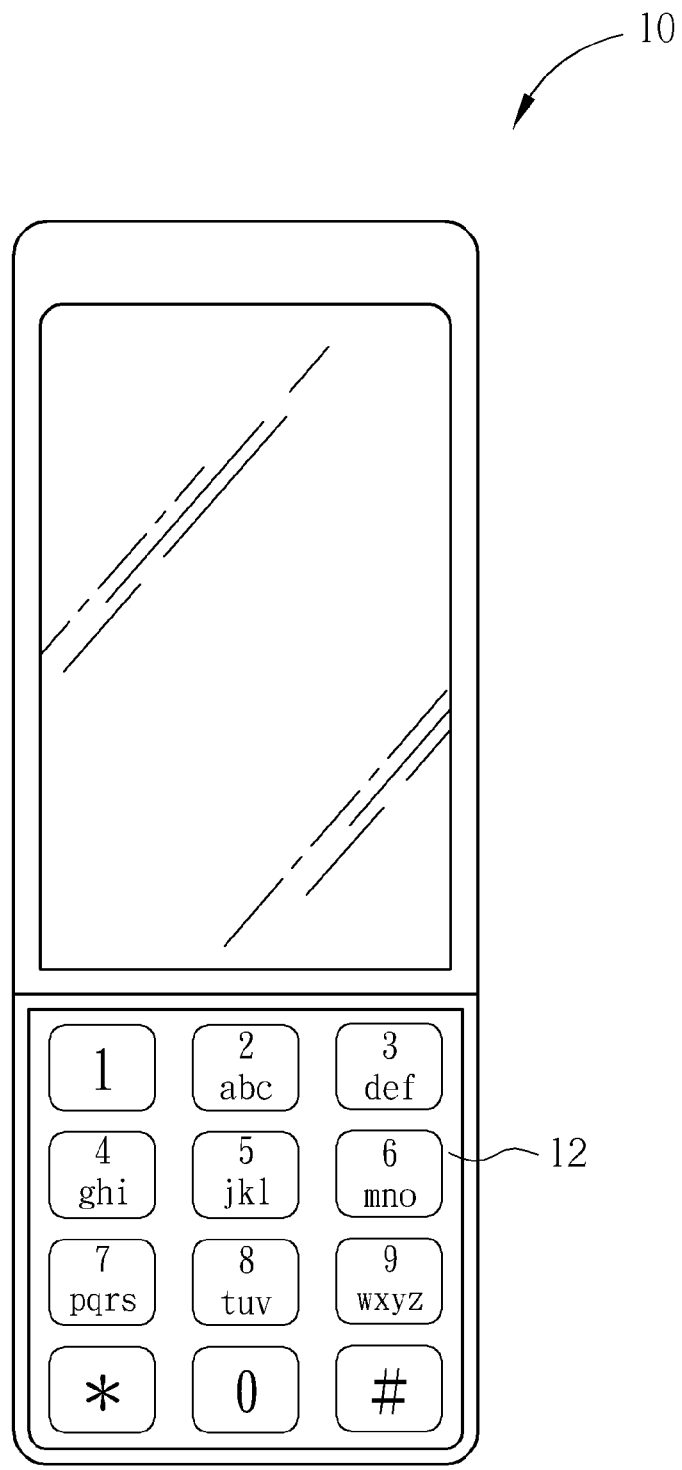
FIG. 2 shows a schematic diagram illustrating an application of an embodiment of the present invention.

An application of an embodiment of the present invention is illustrated by FIG. 2, in which, a cell phone 10 utilizes an electrophoretic display keypad structure 12 according to an embodiment of the present invention to serve as a keypad. The electrophoretic display keypad structure may be also usable in other electronic products.

The electrophoretic display keypad structure according to the present invention is described in detail hereafter.

Figure 3:
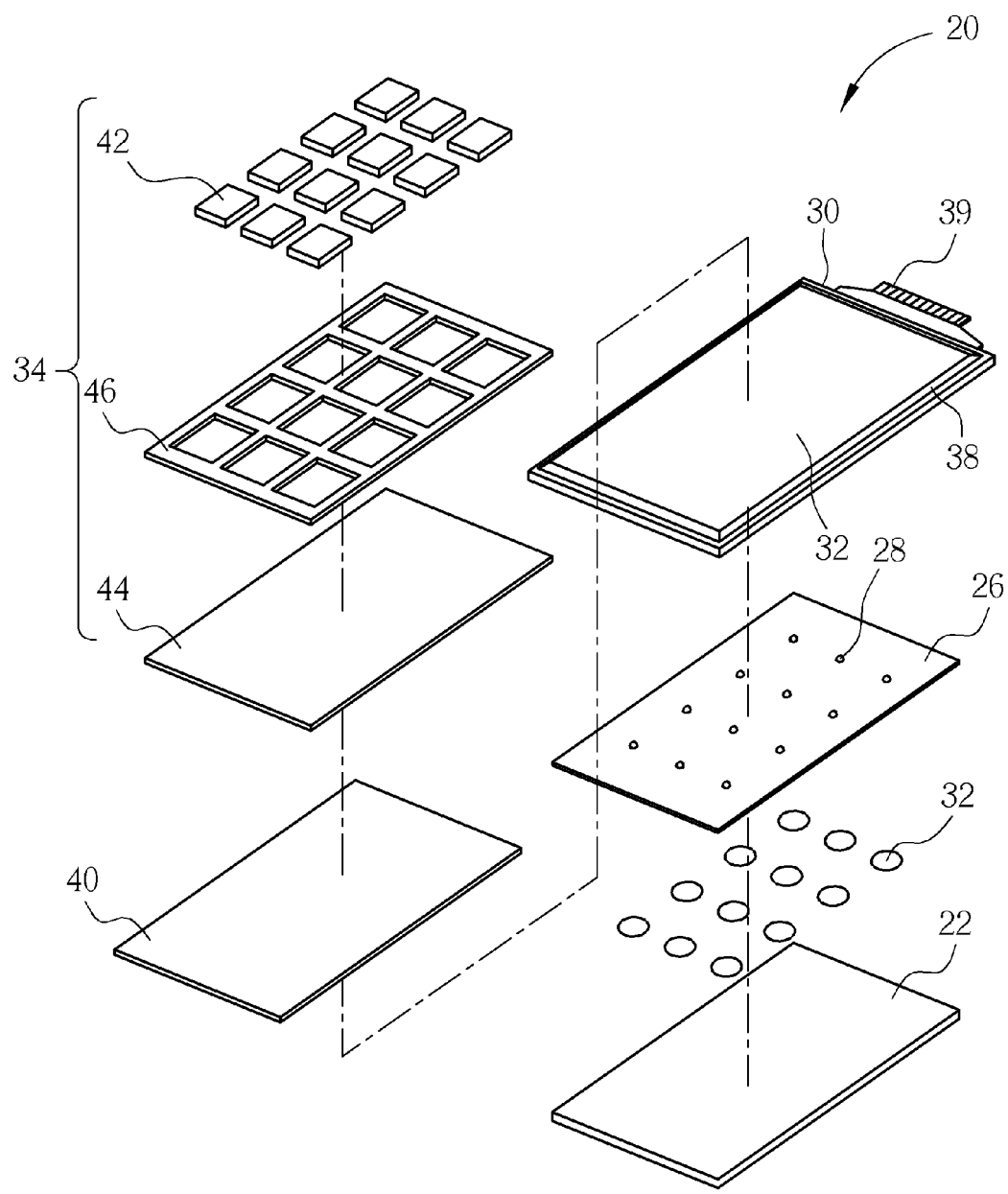
FIG. 3 shows a schematic exploded diagram illustrating an electrophoretic display keypad structure according to an embodiment of the present invention.
Figure 4:
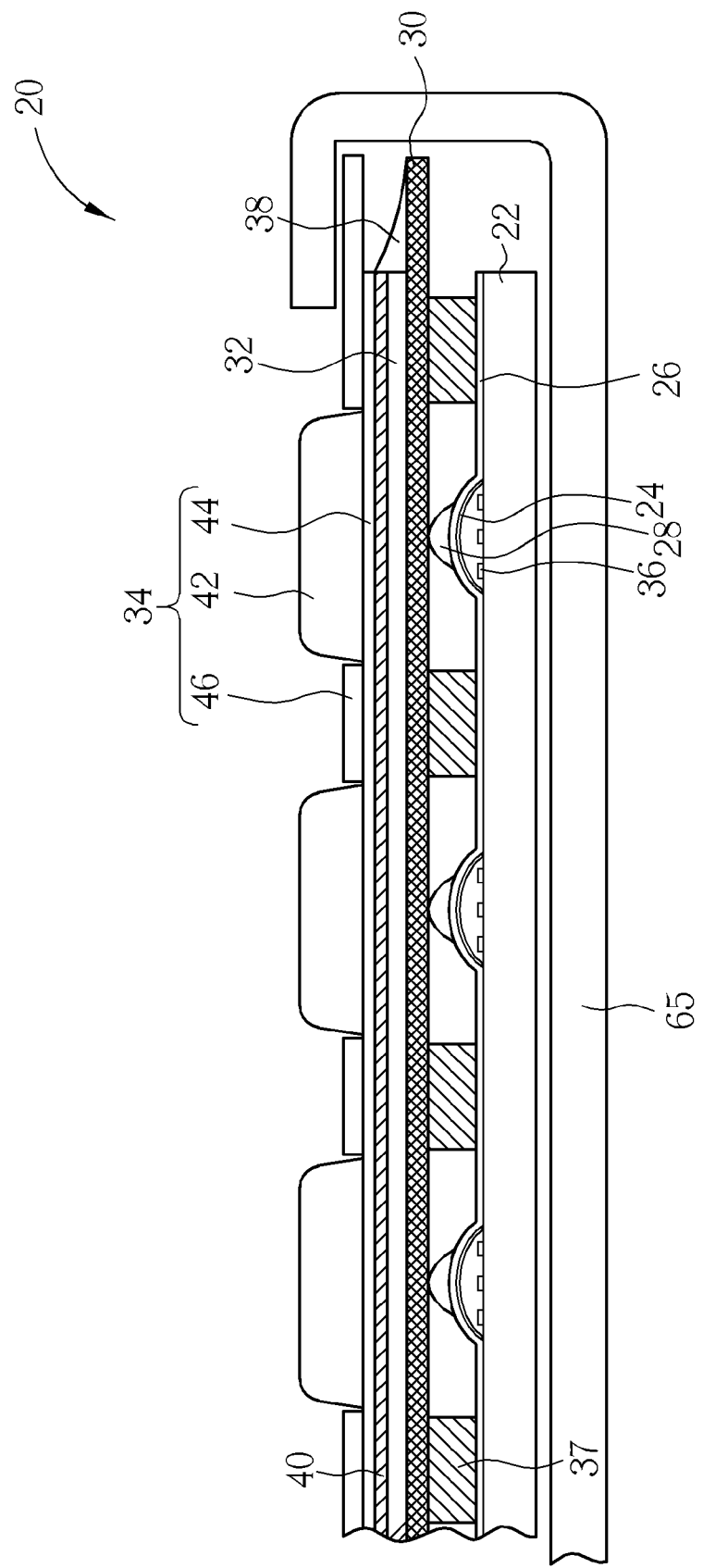
FIG. 4 shows a schematic cross-sectional view illustrating an electrophoretic display keypad structure according to an embodiment of the present invention.

Please refer to FIGS. 3 and 4. An electrophoretic display keypad structure 20 includes a first printed circuit board 22, a plurality of metal domes 24, a plurality of plungers 28, a second printed circuit board 30, an electrophoretic display film 32 and a keycap structure 34. The first printed circuit board 22 may be flexible, and a circuit 36, such as printed circuit, is disposed thereon. Each metal dome 24 is disposed above the circuit 36. When the metal dome is pressed, it is electrically connected to the underlying circuit 36. The metal dome 24 may be secured on the first printed circuit board 22 by the disposition of a dome sheet 26. The dome sheet 26 is adhesive and covers the metal domes 24 to adhere on the first printed circuit board 22, thereby to secure the metal domes 24 on the first printed circuit board 22. The plungers 28 are disposed above the metal domes 24 correspondingly. In a case that the dome sheet 26 is disposed, the plungers 28 may be secured on a surface of the dome sheet 26. The surface is not limited to top surface or bottom surface. The second printed circuit board 30 is disposed above the plungers 28. The plungers 28 may be combined with the dome sheet 26 through for example an adhesive tape 37. The electrophoretic display film 32 is disposed above the second printed circuit board 30. The electrophoretic display film 32 with the second printed circuit board 30 together to form a module for performing a display function. The second printed circuit board 30 may be flexible and it provides an electrode pattern needed for the electrophoretic display film 32 to display figures. The size of the electrophoretic display film 32 is a little smaller than that of the second printed circuit board 30. Accordingly, after the electrophoretic display film 32 is placed on the second printed circuit board 30, the periphery of the electrophoretic display film 32 may be applied with a sealing material 38 or a sealant to achieve a good sealing, for protecting elements or parts within the electrophoretic display film 32. Additionally, as shown in FIG. 4, a chip on film (COF) 39 having a driving integrated circuit may be combined with the second printed circuit board 30 and then the place for combination may be applied with for example silicone. The silicone may provide functions of insulation, protection and binding. The keycap structure 34 is disposed above the electrophoretic display film 32. It has a shape of button for users to press. A frame 65 may be further included to contain the components.

A frontlight unit 40 may be disposed above the electrophoretic display film 32 and may be under the keycap structure 34. The frontlight unit 40 may include a light guide plate and a light source. It may be disposed between the electrophoretic display film 32 and the keycap structure 34 in combination through an optical adhesive or adhesive tape. The light source may be disposed at a side of the guide light plate. The light source may be for example a light-emitting diode (LED). The light guide plate may be a silicone film, a polycarbonate (PC) film, a thermoplastic polyurethane elastomer (TPU) film or a poly(ethylene terephthalate) (PET) film and may have a plurality of nano- or micro-scaled optical dots, such as an optical micro-structure sizing 5 μm to 10 μm.

Figure 5:
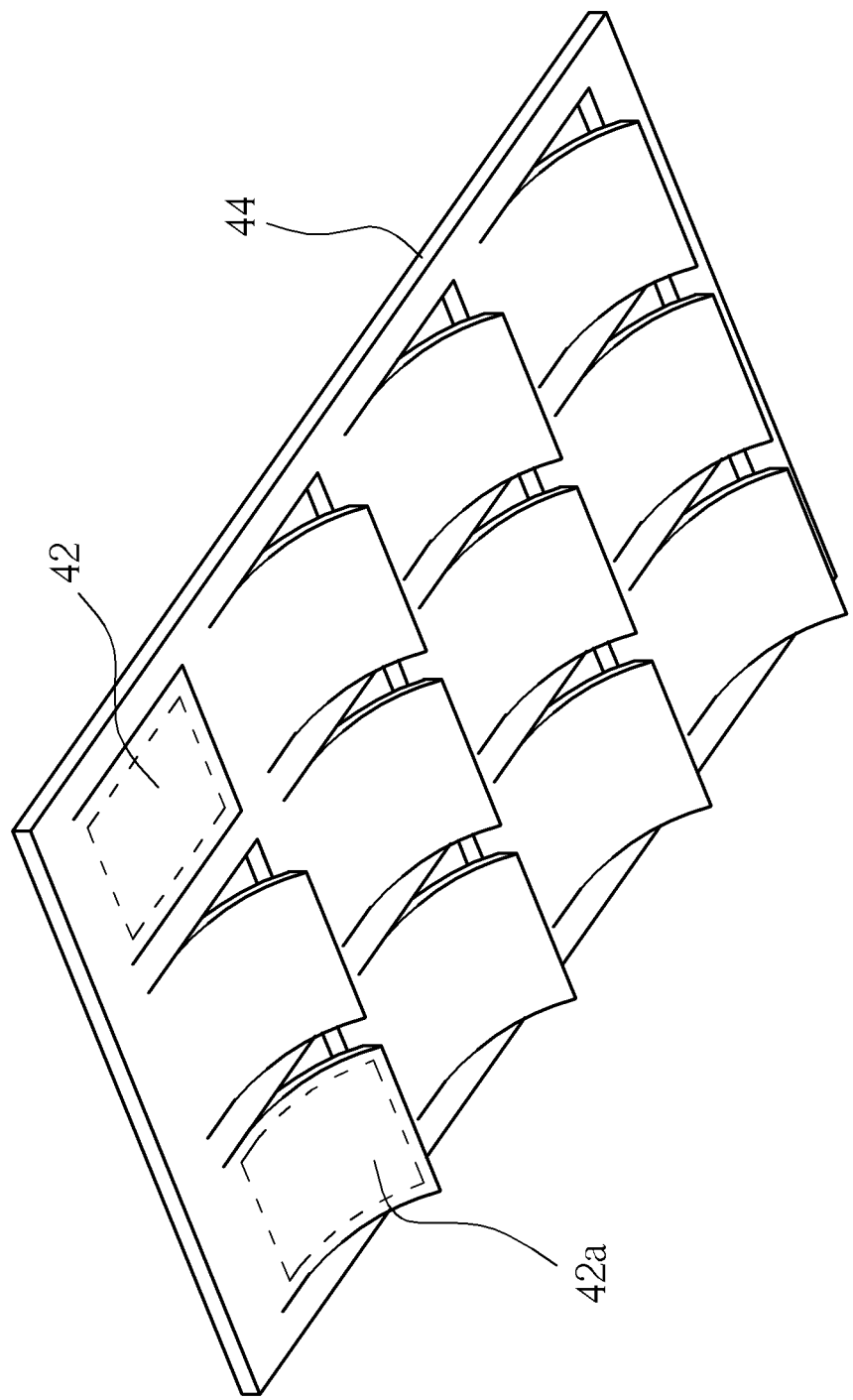
FIG. 5 shows a schematic diagram illustrating a substrate film included in a keycap structure in the electrophoretic display keypad structure according to an embodiment of the present invention.

The keycap structure 34 may include a plurality of button-shaped components 42 and a substrate film 44. The button-shaped components 42 are disposed on the substrate film 44 at a position corresponding to the plungers 28. The button-shaped components 42 and the substrate film 44 may be formed integrally or separately. For example, after the substrate film 44 is provided, a UV-light curable resin is applied on the substrate film 44 to have a button shape and then is cured using a UV-light irradiation to form the button-shaped components 42. The substrate film 44 may include for example PET film. The keycap structure 34 may further include an opaque frame 46 which is disposed on the substrate film 44 and exposing the button-shaped components 42, such that portions of the substrate film 44 among the button-shaped components 42 can be shielded, to achieve both of light-shielding and ornamentation effects. The opaque frame 46 may be for example a metal frame (such as aluminum frame) or a plastic frame. Furthermore, the substrate film 44 may be cut along a periphery of each button-shaped component 42. For example, in the bottom view shown in FIG. 5, it is cut along three sides of each of button-shaped components 42. Thus, when one button is pressed, the whole keycap structure 34 will be not entirely forced to move down. The pressure will be confined within the area of the single button-shaped component 42 and then transferred down to the underlying electrophoretic display film 32, the second printed circuit board 30 and the metal dome 24, and then reaches the printed circuit. For example, as shown by the button-shaped component 42a in FIG. 5, the pressure can be precisely transferred down to the corresponding site of the printed circuit, and thus the pressure transferred to adjacent metal domes can be minimized or avoided.

The electrophoretic display film 32 displays a plurality of figures when a display mode is turned on. The figures are located correspondingly to the positions of the metal domes 24 respectively. When users press a button above a figure, that is, pressing downward to touch the corresponding metal dome 24, the metal dome 24 is allowed to move down to touch the circuit 36 of the first printed circuit board 22 to complete an input of signal. Since the press is made through pressing the metal dome 24, the user can hear a click sound and have a click feeling.

Figure 6:
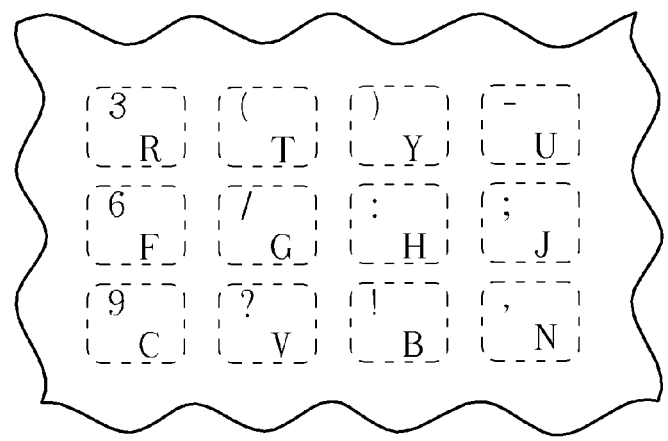
FIG. 6 shows a schematic diagram illustrating two display modes set in an electrophoretic display keypad structure according to an embodiment of the present invention.
Figure 6:
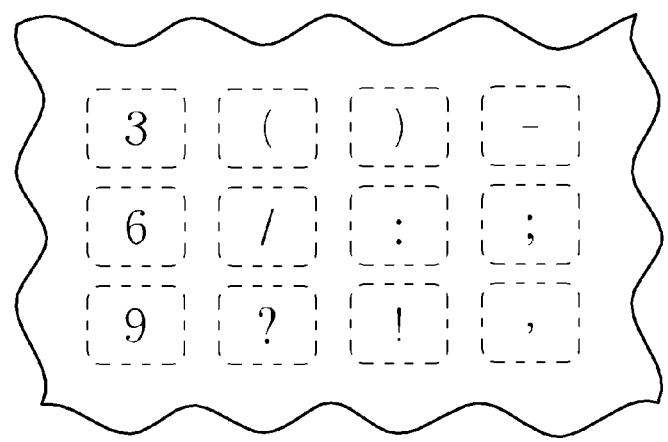
Figure 6:
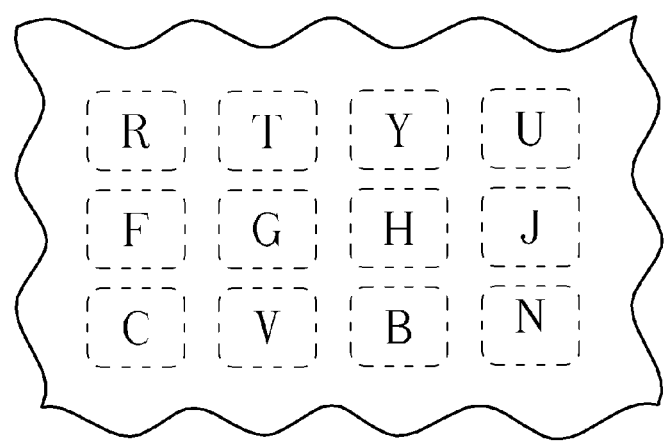

As shown in FIG. 6, another advantage to use an electrophoretic display film is that the figures of the keypad can be displayed in accordance with the mode being set. For example, the mode (a) shown in FIG. 6 is to display figures in both of two modes when the phone is standby; the mode (b) is only to display figures of numbers and punctuation marks for input of numbers and punctuation marks; and the mode (c) is to display figures of English letters for input of English text. The display modes available for switching may be designed as desired and not limited to the aforesaid two modes. After the user selects an input mode, an array of figures for a single mode are displayed. The figures are not complicated and should be easy to read, and a single FIGURE can be relatively large in size and thus easily discerned by users. Accordingly, users can input data or numbers with relatively few hesitation or errors.

Figure 7:
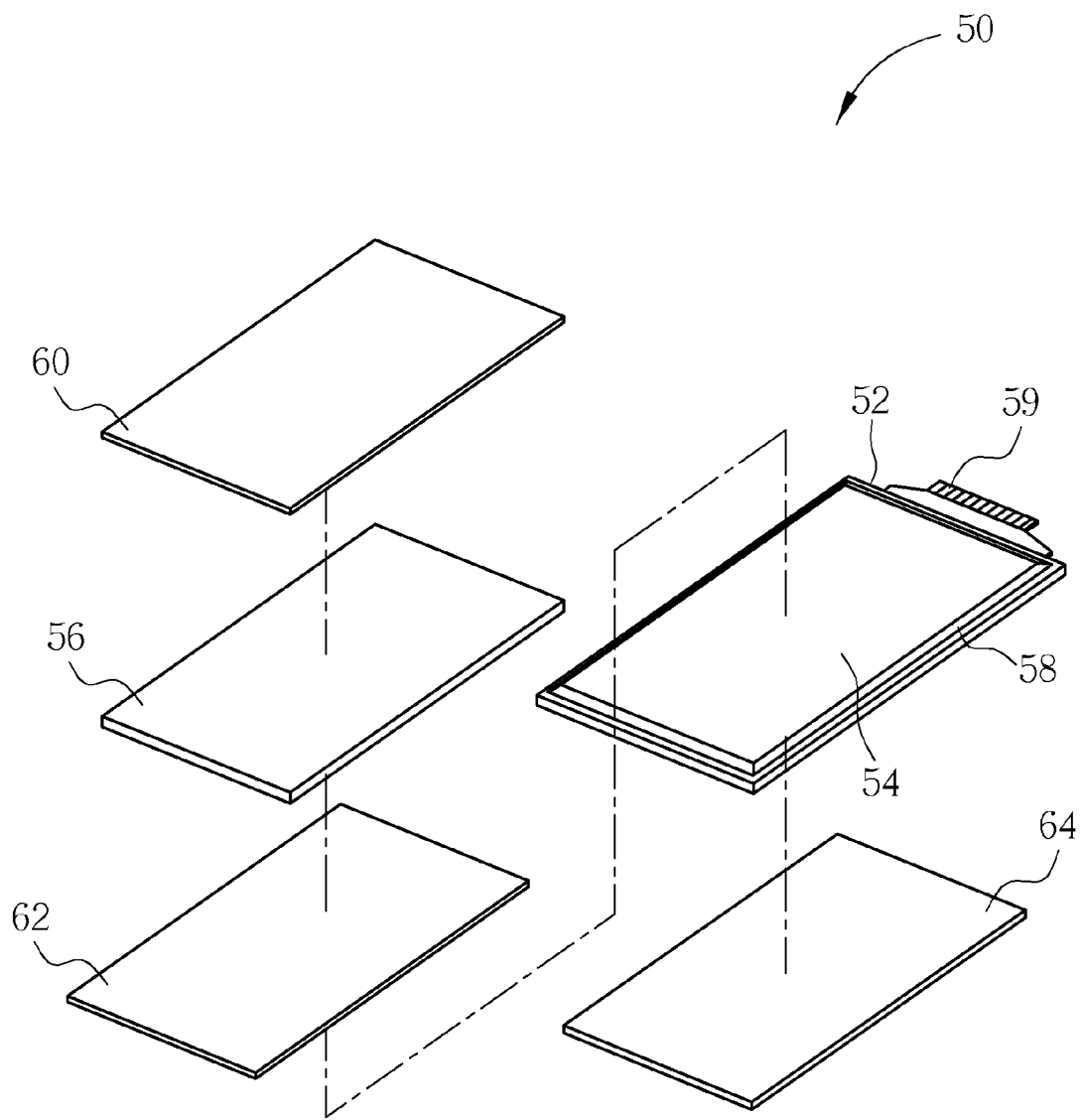
FIG. 7 shows a schematic exploded diagram illustrating an electrophoretic display keypad structure according to another embodiment of the present invention.
Figure 8:
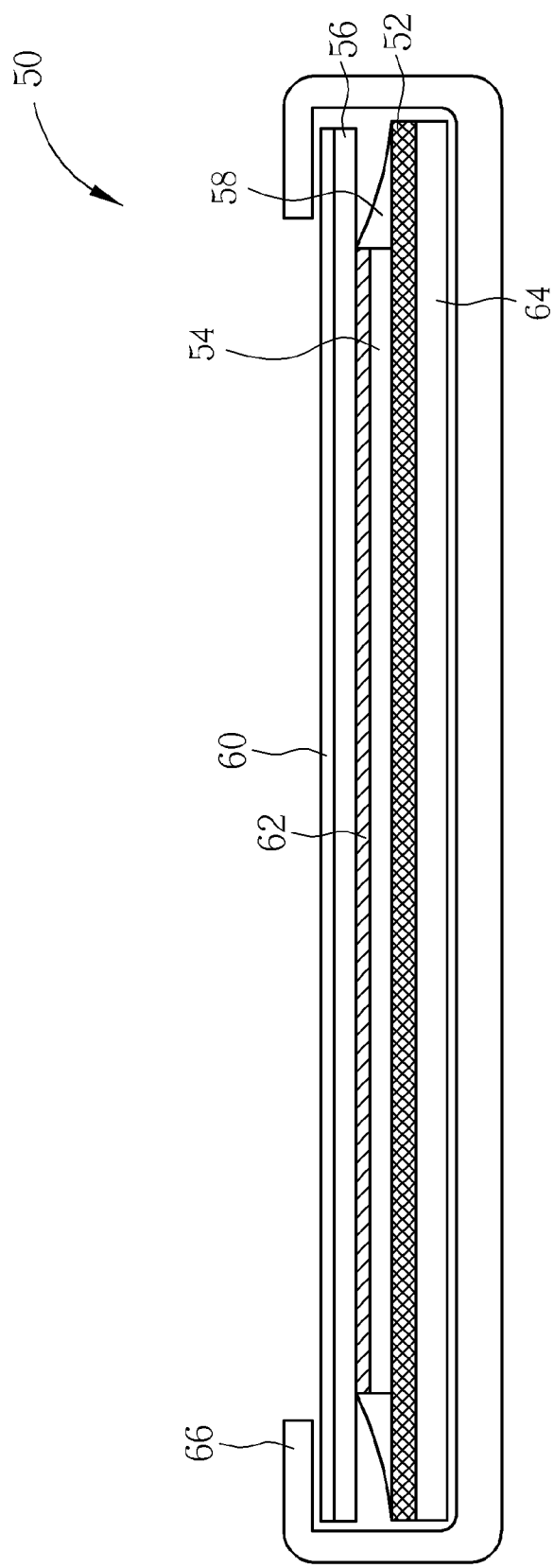
FIG. 8 shows a schematic cross-sectional view illustrating an electrophoretic display keypad structure according to another embodiment of the present invention.

Please refer to FIGS. 7 and 8. In another aspect of the present invention, an electrophoretic display keypad structure 50 according to the present invention comprises a printed circuit board 52, an electrophoretic display film 54 and a touch pad 56. The electrophoretic display film 54 is disposed above the printed circuit board 52 and with the printed circuit board together to perform a display function, the same as the electrophoretic display film 32 and the first printed circuit board 30 shown in FIGS. 3 and 4 mentioned above. As the aforesaid, the printed circuit board 52 may be combined with a chip on film 59. The periphery of the printed circuit board 54 may be sealed with a sealing material 58 or a sealant. The electrophoretic display film 54 displays a plurality of figures for representing as button locations when the display function is turned on. The touch pad 56 is disposed above the electrophoretic display film 54, and both may be combined through for example an optical adhesive or adhesive tape. When users touch the touch pad at a position corresponding to a desired figure corresponding to a button position, the electrophoretic display keypad structure 50 outputs signals corresponding to the figure located under the touch pad being touched. A protection layer 60 may be further disposed above the touch pad 56 for protection. The electrophoretic display keypad structure 50 may further include a frontlight unit 62, which may be disposed between the touch pad 56 and the electrophoretic display film 54 and may be the same as the aforesaid frontlight unit 40. A substrate 64 may be further disposed under the printed circuit board 52 to support the aforesaid components. A housing 66 may be further included to contain the components.

Those skilled in the art will readily observe that numerous modifications and alterations of the device and method may be made while retaining the teachings of the invention.

What is claimed is:

1. An electrophoretic display keypad structure, comprising: a first printed circuit board comprising a circuit thereon; a plurality of metal domes disposed above the circuit, wherein, when the metal domes are pressed, the metal domes are electrically connected to the underlying circuit; a plurality of plungers disposed above the metal domes; the first printed circuit board is disposed below the metal domes; a second printed circuit board disposed above the plungers; an electrophoretic display film disposed above the second printed circuit board and sealed at a periphery thereof, wherein the electrophoretic display film and the second printed circuit board together perform a display function, the electrophoretic display film displays a plurality of figures when the display function is turned on, and the figures are located correspondingly to the metal domes; a front light unit disposed above the electrophoretic display film; and a keycap structure disposed above the front light unit.

2. The electrophoretic display keypad structure of claim 1, wherein the frontlight unit comprises a light guide plate and a light source, the light guide plate is disposed between the electrophoretic display film and the keycap structure, and the light source is disposed on one side of the light guide plate.

3. The electrophoretic display keypad structure of claim 2, wherein the light source comprises a light-emitting diode.

4. The electrophoretic display keypad structure of claim 1, wherein the keycap structure comprises a plurality of button-shaped components and a substrate film, the button-shaped components are disposed on the substrate film correspondingly to the plungers.

5. The electrophoretic display keypad structure of claim 4, wherein each of the button-shaped components is formed through applying a UV-light curable resin on the substrate film and curing the UV-light curable resin by a UV light.

6. The electrophoretic display keypad structure of claim 4, wherein the button-shaped components and the substrate film are integrally formed into one piece.

7. The electrophoretic display keypad structure of claim 4, wherein the keycap structure further comprises a light-tight frame disposed on the substrate film to expose the button-shaped components and to shield the substrate film between the button-shaped components.

8. The electrophoretic display keypad structure of claim 7, wherein the light-tight frame comprises a metal frame or a plastic frame.

9. The electrophoretic display keypad structure of claim 4, wherein the substrate film comprising a plurality of cuts each along a portion of a periphery of each of the button-shaped components, respectively.

10. The electrophoretic display keypad structure of claim 1, further comprising a dome sheet covering and bonding the metal domes on the first printed circuit board to fix the metal domes on the first printed circuit board, wherein the plungers are fixed on the top surface of the dome sheet.

11. The electrophoretic display keypad structure of claim 1, further comprising a dome sheet covering and bonding the plungers and the metal domes on the first printed circuit board to fix the metal domes on the first printed circuit board.

12. The electrophoretic display keypad structure of claim 1, further comprising a housing.

13. An electrophoretic display keypad structure, comprising: a printed circuit board; an electrophoretic display film disposed above the printed circuit board and sealed at a periphery thereof, wherein the electrophoretic display film and the printed circuit board together perform a display function, the electrophoretic display film displays a plurality of figures representing button locations when the display function is turned on; a front light unit disposed above the electrophoretic display film; wherein a first printed circuit board is disposed below the metal domes; a second printed circuit board disposed above the plungers; and a touch pad disposed above the front light unit for output of signals corresponding to the button locations under touched positions of the touch pad.

14. The electrophoretic display keypad structure of claim 13, wherein the frontlight unit comprises a light guide plate and a light source, the light guide plate is disposed between the electrophoretic display film and the touch pad, and the light source is disposed on one side of the light guide plate.

15. The electrophoretic display keypad structure of claim 14, wherein the light source comprises a light-emitting diode.

16. The electrophoretic display keypad structure of claim 13, further comprising a substrate disposed under the printed circuit board.

17. The electrophoretic display keypad structure of claim 13, further comprising a protection layer disposed above the touch pad.

18. The electrophoretic display keypad structure of claim 13, further comprising a housing.

* * * * *